(12) United States Patent
Shefi (10) Patent No.: US 9,678,925 B2
(45) Date of Patent: Jun. 13, 2017

(54) METHOD AND SYSTEM FOR DISPLAYING VISUAL CONTENT IN A VIRTUAL THREE-DIMENSIONAL SPACE

(76) Inventor: Yoav Shefi, Tel Aviv (IL)

(*) Notice: Subject to any disclaimer, the term of this patent is extended or adjusted under 35 U.S.C. 154(b) by 664 days.

(21) Appl. No.: 13/703,446

(22) PCT Filed: Jun. 9, 2011

(86) PCT No.: PCT/IB2011/052522
§ 371 (c)(1),
(2), (4) Date: Dec. 11, 2012

(87) PCT Pub. No.: WO2011/154917
PCT Pub. Date: Dec. 15, 2011

(65) Prior Publication Data
US 2013/0104018 A1    Apr. 25, 2013

Related U.S. Application Data

(60) Provisional application No. 61/354,019, filed on Jun. 11, 2010.

(51) Int. Cl.
| | |
|---|---|
| *G06F 17/21* | (2006.01) |
| *G06F 3/0481* | (2013.01) |
| *G06F 17/30* | (2006.01) |
| *G06T 19/00* | (2011.01) |
| *G06F 17/22* | (2006.01) |

(52) U.S. Cl.
CPC ........ *G06F 17/212* (2013.01); *G06F 3/04815* (2013.01); *G06F 17/2235* (2013.01); *G06F 17/30873* (2013.01); *G06T 19/003* (2013.01)

(58) Field of Classification Search
CPC .. G06F 3/04815; G06F 3/0481; G06F 3/0482; G06F 17/30873; G06F 17/212
See application file for complete search history.

(56) References Cited

U.S. PATENT DOCUMENTS

| | | | | |
|---|---|---|---|---|
| 5,452,406 | A | * | 9/1995 | Butler et al. ................. 345/426 |
| 5,870,559 | A | * | 2/1999 | Leshem et al. ............... 709/224 |
| 5,912,668 | A | * | 6/1999 | Sciammarella et al. ...... 715/788 |

(Continued)

FOREIGN PATENT DOCUMENTS

| | | |
|---|---|---|
| WO | 02095685 | 11/2002 |
| WO | 2007033354 | 3/2007 |

(Continued)

OTHER PUBLICATIONS

International Search Report for PCT/IB2011/052522, Completed by the European Patent Office on Dec. 4, 2012, 5 Pages.

*Primary Examiner* — Stephen Hong
*Assistant Examiner* — Hope C Sheffield
(74) *Attorney, Agent, or Firm* — Browdy and Neimark, PLLC (57) ABSTRACT

A system and method for displaying pages in a 3D virtual space. A set of pages may be portioned into one or more clusters of pages that are arranged in a plane in the 3D space so that for each cluster, the pages in the cluster are arranged contiguously in the plane. A boundary may then be formed in the plane around pages of the cluster. If a first page in a cluster contains an active link, a page opened by activating the link is positioned in the plane within the boundary of the cluster in a selectable position relative to the first page.

9 Claims, 9 Drawing Sheets

(56) References Cited

U.S. PATENT DOCUMENTS

| | | | |
|---|---|---|---|
| 6,434,556 B1* | 8/2002 | Levin et al. | |
| 7,735,018 B2 | 6/2010 | Bakhash | |
| 2002/0176636 A1* | 11/2002 | Shefi | 382/285 |
| 2006/0156228 A1* | 7/2006 | Gallo et al. | 715/523 |
| 2007/0022389 A1* | 1/2007 | Ording et al. | 715/790 |
| 2008/0059893 A1* | 3/2008 | Byrne et al. | 715/757 |
| 2009/0083678 A1* | 3/2009 | Fitzmaurice et al. | 715/858 |
| 2009/0169128 A1* | 7/2009 | Hentschel et al. | 382/260 |
| 2009/0234721 A1* | 9/2009 | Bigelow et al. | 705/12 |
| 2011/0261052 A1 | 10/2011 | Shefi | |
| 2011/0289459 A1* | 11/2011 | Athans et al. | 715/854 |

FOREIGN PATENT DOCUMENTS

| WO | WO 2007/039477 | * 4/2007 |
|---|---|---|
| WO | 2010064236 | 6/2010 |

* cited by examiner

METHOD AND SYSTEM FOR DISPLAYING VISUAL CONTENT IN A VIRTUAL THREE-DIMENSIONAL SPACE

CROSS-REFERENCE TO RELATED APPLICATION

This application is the U.S. national phase of PCT Appln. No. PCT/IB2011/052522 filed on Jun. 9, 2011, which claims the benefit of U.S. provisional Application No. 61/354,019 filed Jun. 11, 2010.

FIELD OF THE INVENTION

This invention relates to methods for displaying and manipulating visual content on a screen.

BACKGROUND OF THE INVENTION

Computer screens and other two-dimensional (2D) surfaces are commonly used for displaying 2D visual content such as a page of text, a diagram or a Web site page. Some forms of visual content contain two or more content forms, such as a page consisting of text and diagrams, or a Web site page containing information related to the site and unrelated advertising. Usually, only one page is displayed on a screen at a time and the page is confined to the boundaries of the screen. The different elements in a page must therefore compete with each other for space and the viewer's attention, even if they are related to each other. Existing Web site pages are therefore generally overcrowded by advertising and this is the major reason why Web advertising is presently considered ineffective.

Changing a displayed page (known as browsing or navigating) is a discontinuous process wherein an initially displayed page is removed from the screen and a second page is subsequently displayed. The ability to view only one page at a time makes it difficult for a viewer to know his location at a website and also creates uncertainty while navigating through the site. Changes in the size of a page are also made in discrete steps, and a return to the browser is required for each step change.

Another form of browsing allows a user to maintain several pages and websites concurrently browsable. For example, it is known to arrange several pages in a virtual three-dimensional (3D) space and projecting a portion of the 3D space onto the 2D screen. A viewer may continuously navigate from page to page. Such methods are disclosed, for example, in Robertson et al (Data Mountain: using Spatial memory for document Management) Robertson et al (Task Gallery: a 3D Window Manager) and in Applicant's publication WO02/095685.

SUMMARY OF THE INVENTION

The present invention provides a method and system for displaying pages in a 3D virtual space. The invention may be used with any method for rendering a 3D virtual space into 2D.

In one of its aspects, the present invention provides a method and system for arranging pages in a 3D space or in a 2D open plane. By 'open plane' we mean a planar surface that may contain an arbitrary number of pages as desired. Since a 2D open plane may be considered to be a case of 3D space where the plane is viewed then for brevity both the 3D space and the 2D open plane shall hereinafter be referred to as '3D space'. In accordance with this aspect of the invention, 2D pages are arranged on plane in a 3D space so that related pages are clustered together. Each cluster of pages on the plane is delineated in a way that allows the individual clusters to be easily differentiated. Clustering supports the dynamic nature of browsing: As more pages are opened, either as 'descendants' of existing pages through activating hyperlinks and other connective mechanisms, or directly through direct input of a page's URL, relations are created among the pages. As demonstrated below, clustering can be used to reflect the evolving relationships among the pages.

Thus, in one of its aspects, the invention provides a method for displaying a set of two or more pages in a 3D virtual space comprising (a) partitioning the set of pages into one or more clusters of pages, (b) arranging the pages in a plane in the 3D space so that for each cluster, the pages in the cluster are arranged contiguously in the plane, and (c) for each cluster, forming a boundary in the plane around pages of the cluster. A first page in a cluster may contain an active link, and a page opened by activating the link may be positioned in the plane within the boundary of the cluster in a selectable position relative to the first page. The position of the boundary may be changed when a new page is added to the cluster. The boundary may have an interior edge and an exterior edge, the interior edge being distinguishable from the exterior edge. For example, the interior edge may be sharp and the exterior edge may be diffused. Activating a first link on a first page may open a first child page designated as a second opened page, and the first page and first child page may be included in a first cluster. When a first active link is activated in the second page, a first child designated as a third page may be opened that is included in the first cluster. All the first active links activated in pages already opened in the first cluster may open new pages which are included in the first cluster. Activating a second active link in a second page may open a second child page and the second page and the first child page of the second page and the second child page of the second page may be removed from the first cluster and included in a second cluster. Any number of first child pages opened through activating links in a first page may be included in the same cluster as the first page. Moving the cursor in a manner which decreases the distance to the rectangle edge closest to the cursor may simultaneously cause the rectangle edge to move closer to the cursor. While the cursor is being moved so as to generate motion in the direction of the cursor, a motion into the depth direction may be generated with a speed proportionate to the motion towards that direction.

In another of its aspects, the invention provides a method for navigating above a plane in a 3D space comprising (a) positioning a rectangle in a 2D rendition of the 3D space so that a portion of the plane is viewed through the rectangle, (b) positioning a cursor in the 2D rendition, (c) if the cursor is positioned outside the rectangle, moving the rectangle over the plane in a direction determined by the cursor while keeping the rectangle fixed in the 2D rendition, and (c) when the cursor is positioned in the interior of the rectangle, the rectangle does not move.

In this aspect of the invention, a speed of movement of the rectangle over the plane may be determined by a distance from the cursor to a nearest edge of the rectangle. For example, the speed of movement of the rectangle over the plane may increase with increasing distance between the cursor and the rectangle. The speed of movement of the rectangle may have, for example, a sigmoidal, parabolic or sinusoidal relationship to the distance between the cursor and the rectangle. When the distance of the cursor from the rectangle causes an increase in the speed of movement, moving the cursor in a manner which decreases the distance to the rectangle may cause a decrease in the speed of movement at a faster rate than the rate of increasing speed with increasing distance.

After a motion speed has been decelerated, movement of the cursor in a manner that increases the distance of the cursor form the rectangle may further accelerate the acceleration of speed until the speed matches a speed determined by the distance of the cursor from the rectangle.

In another of its aspects, the invention provides a method for displaying a pop-up menu associated with an item in a page displayed in a 3D virtual space comprising: detecting a pop-up menu to be displayed by determining that a user has positioned a cursor over the item; and positioning the pop-up at an angle to a viewing screen.

In this aspect of the invention, menu items may be displayed tilted from a background of the pop-up menu. An arrow may be displayed from the pop-up menu pointing to an item in the page.

The invention also provides a method for displaying a second web page in a 3D virtual space, the second web page being displayed upon activating a link in a first webpage, comprising: (a) detecting that a predetermined key on a keyboard or a computer mouse has been activated, (b) displaying the second webpage in the 3D space over the first web page as long as the predetermined key continues to be activated, and (c) removing the second webpage when the predetermined key is released.

The invention further provides a method for displaying a second web page in a plane in 3D virtual world, the second web page being displayed upon activating a link in a first web page, comprising: (a) detecting that a cursor has been moved to a position over the link, (b) producing a graphical element on the first web page, (c) in response to a determination that the cursor is positioned over the graphical element, causing the second web page to be displayed in the 3D space over the first web page and the graphical element to be displayed over the displayed second web page at the same position as on the first web page, (d) removing the second web page when the cursor is moved off the graphical element.

The method may further comprise detecting whether the graphical element has been activated, and responsive to a determination that the graphical element has been activated, the second web page may be caused to behave like the first web page.

The invention also provides a method for anti-aliasing of a content element comprising a picture of an object and a background, the method comprising: (a) selecting one or more pixels in the background of the content element, (b) scanning the pixels of the content element making pixels having a color similar to that of the selected one or more background points transparent to generates a first modified image of the content element, (c) applying a bilinear filter to the first modified image in which the color of a given pixel is replaced with the average of the color of a set of two or more pixels contiguous with the given pixel and including the given pixel to generate a second modified image of the content element, and (d) superimposing the first and second modified images to generate a third modified image.

In this aspect of the invention, the method may further comprise adding the second modified image to the third modified image to generate a fourth modified image in which the second modified image is oriented so as to provide an effect of shading of the object.

The invention also provides a method for navigating web pages in 3D space comprising (a) arranging a collection of web page images arranged in a declining orbit on the plane where (b) selecting a page image may move the view to the selected page corresponding to the selected image. The page images may represent a series of ancestor source pages and predecessor pages, each predecessor page have been opened by activation of a link in an ancestor page, arranged in an inward spiral. Each predecessor page image may partially overlap an ancestor page image. The page images may represent only pages left open on the plane in the 3D space. If a first descendant page is missing on the plane then the closet descendant page image may be positioned as the page image descendant to the ancestor page in the inward spiral arrangement.

Each of the ancestor page images may be on top of its closest predecessor page image or each of the predecessor may be on top of the ancestor.

The invention also provides a system comprising a processor configured to execute any method of the invention.

Also provided by the invention is a computer program product for use in a computer system, the computer program product comprising one or more non-transitory computer-readable media having stored thereon computer executable instructions that, when executed by a processor, cause the computer system to perform the method recited in any one of the previous claims.

BRIEF DESCRIPTION OF THE DRAWINGS

In order to understand the invention and to see how it may be carried out in practice, embodiments will now be described, by way of non-limiting example only, with reference to the accompanying drawings, in which:

FIG. 4a shows a page positioned in a 3D space having an active link;

FIG. 4b shows the page of FIG. 4a together with a page opened by activating the link of the page of FIG. 4a;

FIG. 6b shows the web page of FIG. 6a together with a second web page overlying the web page of FIG. 6a;

DETAILED DESCRIPTION OF EMBODIMENTS

Figure 1A:
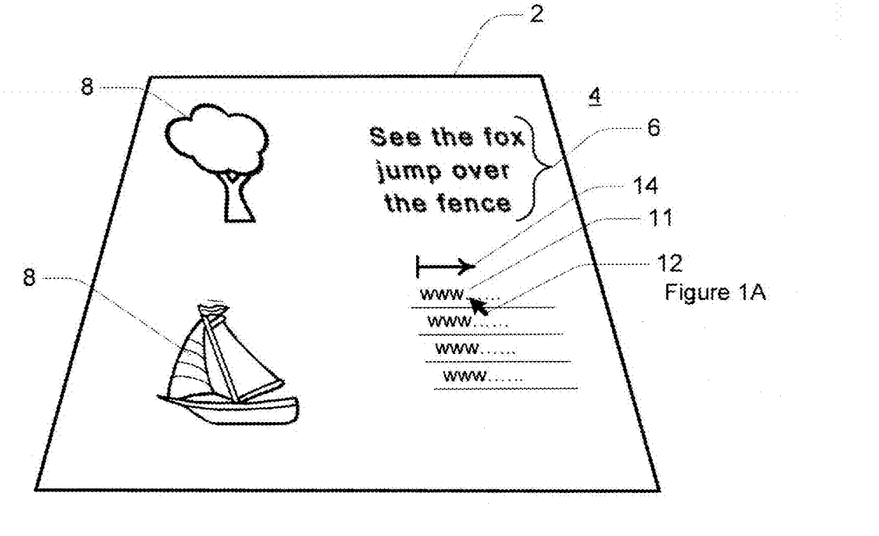
FIG. 1a shows a first web page positioned in a plane in a 3D space.
Figure 1B:
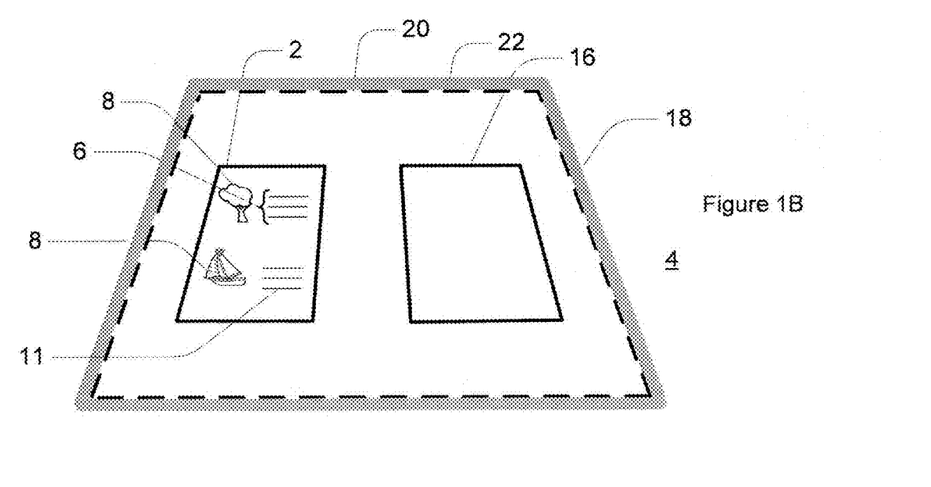
FIG. 1b shows a second web page positioned in the 3D space together with the first web page, where the first and second web pages are surrounded by a boundary.

One embodiment of this aspect of the invention is shown in FIG. 1. In FIG. 1a, a web page 2 has been opened and positioned on a plane 4 in a 3D space. The webpage 2 typically contains textual material 6, and one or more pictures 8. The webpage 2 also usually contains one or more live links 11 to other web pages, or to another scrollable view locations inside the page 2. A user can move a cursor 12 to point at a link 11 and click on the link in order to open the linked web page in a position in 3D space which does not replace or overlap page 2. In accordance with this aspect of the invention, when the cursor 12 is pointing at link 11, an arrow 14 appears on the screen. The direction of the arrow is selectable by the user and indicates on which side of the present page 2 the new webpage is to be opened. If the new web page is to be opened on the right side of the page 2, the user will point the arrow 14 to the right, as indicated in FIG. 1a, and will then click on the link.

In another embodiment, a link may be opened by clicking to the right and the newly opened pages and the previously opened pages are arranged in the plane according to a predetermined rule. In this case, when the cursor is on a given link the location of the page opened by the link is revealed and clicking on the link takes the user to that page. In another embodiment, the link is dragged to a desired direction for the location for page to open therein and when the cursor is released the page is opened at the location of the cursor. Pointing to the opened link causes an arrow to appear pointing to the newly opened page. Clicking on the arrow may take the user to the page. In yet another embodiment, a predetermined movement to the opened page occurs when the cursor is released from the drag operation. If the source page is viewed again after opening the link, and the link is pointed at, the arrow may appear as described above.

As shown in FIG. 1b, in response to clicking on the link 11 with the arrow 14 pointing to the right, the new web page 16 is opened and positioned in the plane 4 on the right side of the page 2. In addition, a boundary 18 has been formed in the plane 4 around the two pages 2 and 16. This creates a spatial relationship between the pages 2 and 16 indicating that the pages 2 and 16 are related. The boundary 18 has an inner edge 20 that is visually distinguishable from its outer edge 22. For example, as shown in FIG. 1b, the inner edge 20 may be sharp while the outer edge 22 is diffused. This allows the inner and outer edges of the boundary to be easily distinguished which facilitates the determination of which pages are included inside the boundary, and which are adjacent to, but outside, the boundary. This is particularly useful in close-up scenes in which only a portion of the boundary is observed.

Figure 7A:
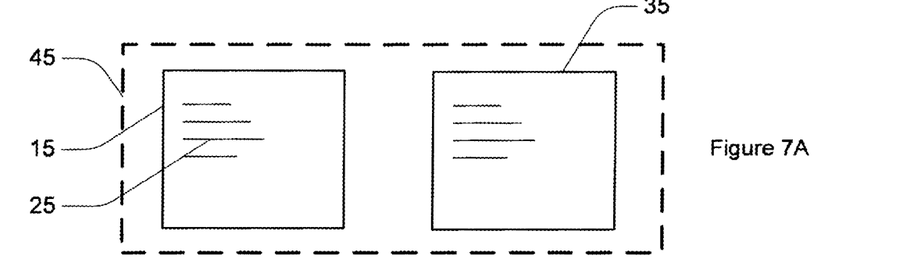
FIG. 7a shows two web pages positioned in a 3D space surrounded by a boundary.
Figure 7B:
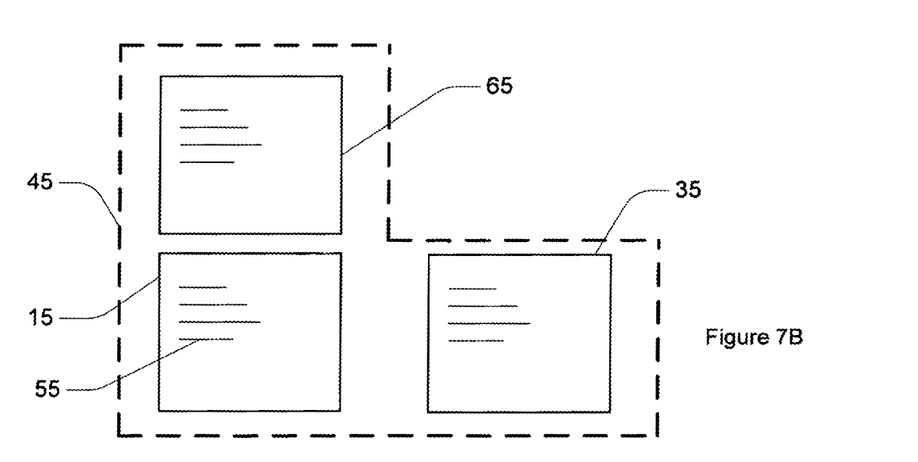
FIG. 7b shows a third web page positioned in the 3D space together with the first and second web pages of FIG. 7a, where the first second and third web pages are surrounded by a boundary.
Figure 7C:
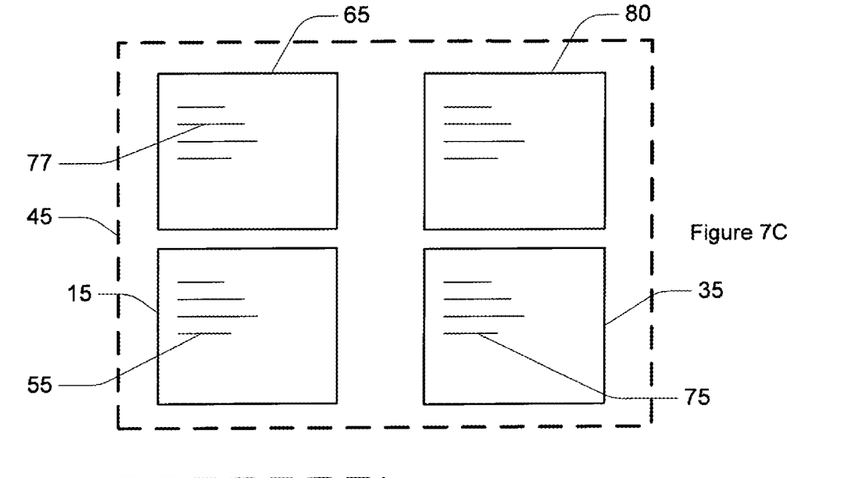
FIG. 7c shows four web pages surrounded by a common boundary.
Figure 7D:
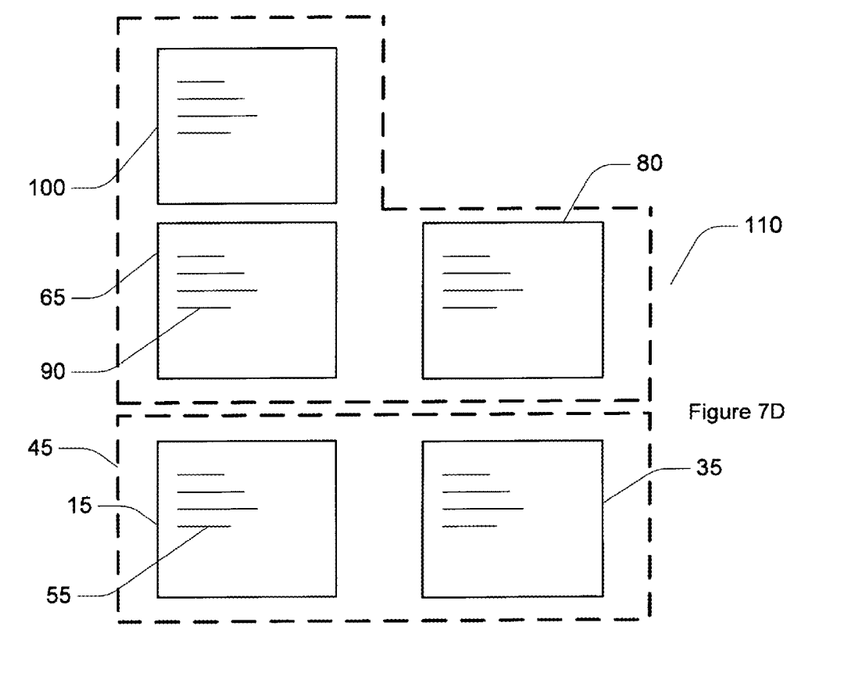
FIG. 7d shows two clusters of web pages.

The process of clicking on a link to open a web page may be repeated any number of times. Starting with the arrangement of the pages 15 and 35 shown in FIG. 7a, where web page 35 has been opened through activating link 25 on web page 15 and positioned on the plane next to page 15, cluster boundary 45 contains web pages 15 and 35. In FIG. 7b, if a second link 55 on the page 15 (also in FIG. 7a)is activated then the newly opened web page 65 is also positioned on the plane and is also included in cluster 45 and border 45 has been enlarged to include the new page 65. In FIG. 7c, if link 77 on web page 65 (also in FIG. 7b)is activated, being the first activated on page 65, then the opened web page 80 is also included in cluster 80. The same rule would have been applied to link 75 in web page 35 should it have been the first link to be activated on page 35—the new opened page opened from link 75 would have been also included in cluster 45. However, as shown in FIG. 7d, if a second link 90 on page 60 page 65 (also shown in FIG. 7c)is activated then web page 100 is opened, and page 65 and page 80 and page 100 are removed from cluster 45 and are contained within a new cluster 110. Each of clusters 45 and cluster 110 receive their individual distinctive border. In one embodiment of the invention the new cluster 110 border of the pages 65, 80 and 100 would have been especially highlighted to signify that this is the new cluster formed.

In this way, each boundary will contain web pages that are related to each other either by direct linkage or by a chain of single links. This keeps the boundaries from containing too many pages and also signifies the context in which the pages were opened such as when several links are opened from a web page it becomes a distinctly individualized subject matter in its own. Separating clusters of web pages in the described methods and system is helpful in indicating to the user the evolution of the browsing session. In one embodiment of the invention the clusters all lie on the same base plane. Yet in another embodiment of the invention clusters created as a child of a previous cluster may be elevated in 3D space above the previous cluster.

Figure 2:
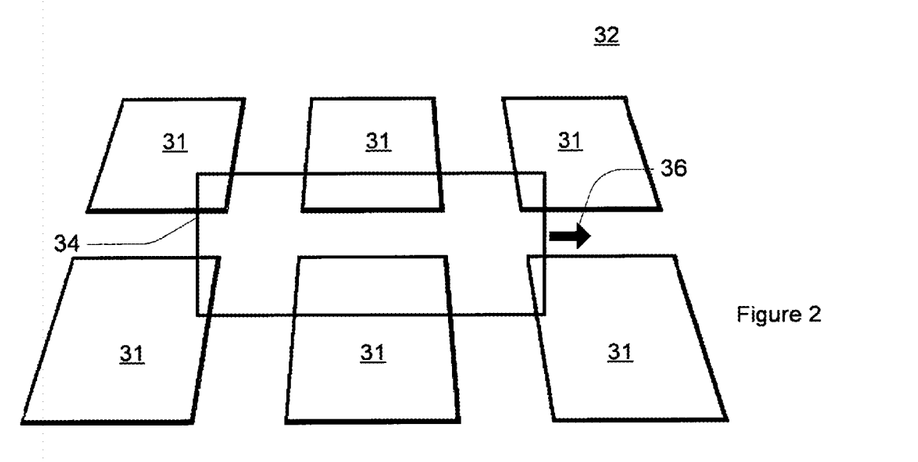
FIG. 2 shows pages arranged in a 3D space, and a rectangle positioned in the 3D space over the pages.

In another of its aspects, the invention provides a method and system for navigating above a plane in a 3D space. FIG. 2 shows pages 31 that have been positioned on a plane 32 in a 3D space. A rectangle 34 is positioned in the 2D rendition of the 3D space so that a portion of the plane 32 is viewed through the rectangle 34. The rectangle 34 may be rendered into the 2D rendition of the 3D space, as shown in FIG. 2, or it may be added over that rendition implicitly as a non-rendered geometrical object. When the user positions a cursor 36 in the 2D rendition outside the rectangle, for example, as shown in FIG. 2, the rectangle 34 moves over the plane 32 in the direction of the cursor 36. The position of the rectangle 34 on the screen (not shown) however does not change, so that the plane 32 appears to move in the direction opposite to the direction of the cursor 36. The speed of movement of the rectangle 34 over the plane may be constant. In one embodiment, the speed of movement of the rectangle 34 can be selected by the user by the distance from the cursor 36 to the nearest edge of the rectangle 34. When the cursor 36 is relatively near the rectangle 34, movement of the rectangle is relatively slow. As the distance between the cursor and the rectangle increases, the speed of motion of the plane 32 increases. In another embodiment, the speed has a sigmoidal relationship to the distance between the cursor 36 and the rectangle 34. In other embodiments, the speed of movement of the rectangle has a parabolic a sinusoidal relationship, a polynomial relationship or a combination of two or more mathematical relationships to the distance between the cursor and the rectangle. When the cursor 34 is positioned by the user in the interior of the rectangle 34, the plane 32 does not move.

Figure 3:
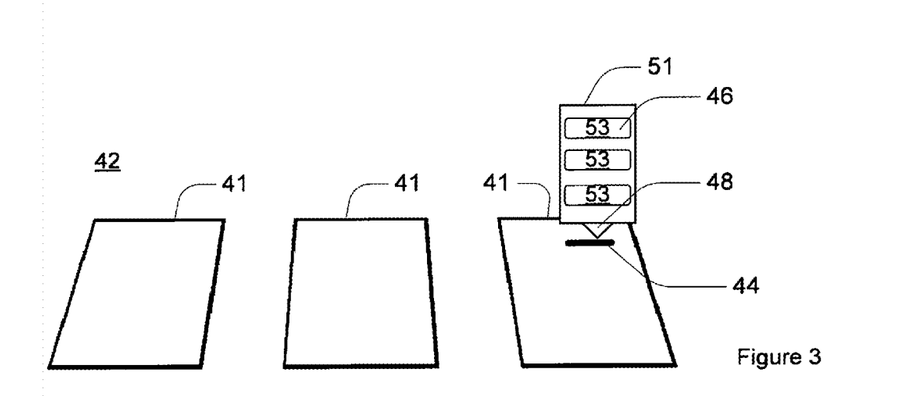
FIG. 3 shows pages arranged in a 3D space and with a pop-up menu tilted out of one of the pages.

In another of its aspects, the invention provides a method and system for displaying a pop-up menu in a 3D virtual space. FIG. 3 shows pages 41 arranged on a plane 42 in a 3D space. When a user wishes to view a pop-up menu associated with an item 44 in one of the pages 41, the associated pop-up menu 46 appears in the 3D space. Typically, the pop-up menu 46 is elicited by the user positioning a cursor over the item 44 and clicking on the right side button on a computer mouse. The pop-up menu 46 is preferably positioned at an angle to the viewing screen, and, in general, is not parallel to the plane 42. An arrow 48 at the bottom of the pop-up menu 46 points to the item 44 with which the menu 46 is associated. The user may then select one of the items 53 on the menu by positioning the cursor on the desired item 53 and left clicking the computer mouse. As shown in FIG. 3, the menu may be presented with the menu items 53 at an angle to the menu surface 51. Tilting the menu surface 51 indicates where and what in the 3D space the menu relates to, while tilting the individual menu items 53 relative to the menu surface 51 enhances the legibility of the menu items to the viewer.

Figure 4:
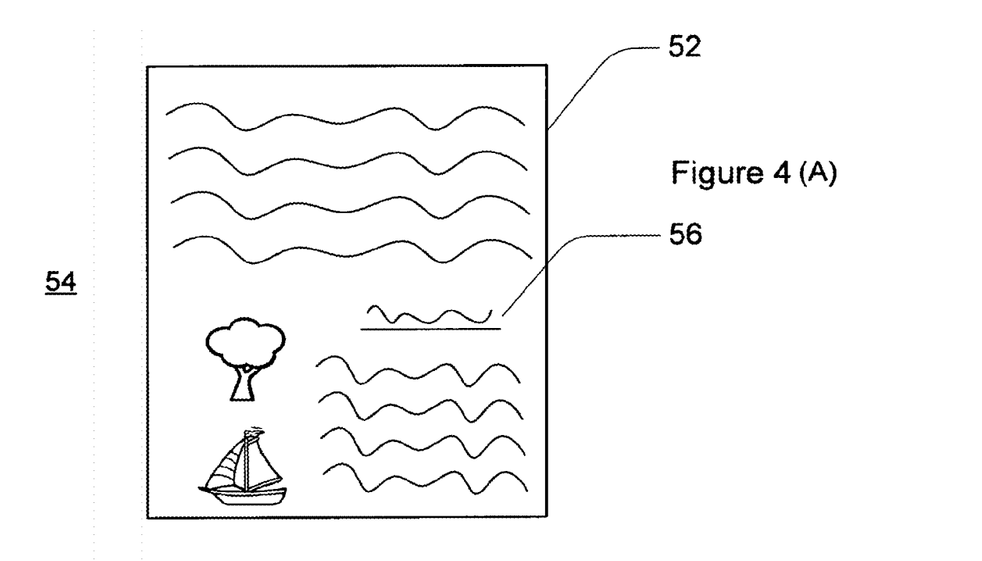

In yet another of its aspects, the invention provides a method and system for displaying a web page in a 3D virtual space. FIG. 4a shows a web page 52 positioned in a plane 54 in a 3D virtual space. The page 54 has an active link 56. When the user wishes to view the web page opened by the link only temporarily, without leaving the page 52, the user may indicate this by pointing a cursor at the link 56 or by depressing a predetermined key on a keyboard which may produce a graphical element underneath the cursor.

In this case, as shown in FIG. 4b, the page 58 opened by the link 56 is positioned over the page 52 in the 3D space. The page 58 continues to be displayed as long as the predetermined key continues to be depressed or the cursor is still pointing at the link. When the user no longer wishes to view the page 58, the predetermined key is released, or the cursor removed from the previously pointing position and the page 58 disappears revealing again the page 52, as shown in FIG. 4a.

Figure 6A:
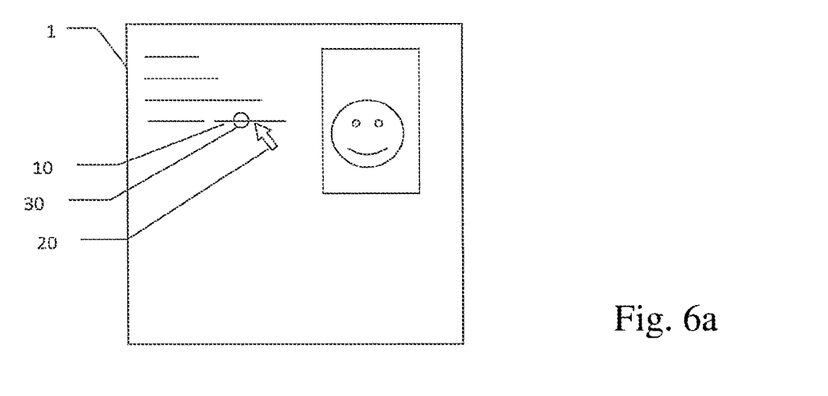
FIG. 6a shows a web page positioned in a 3D space having an active link.
Figure 6B:
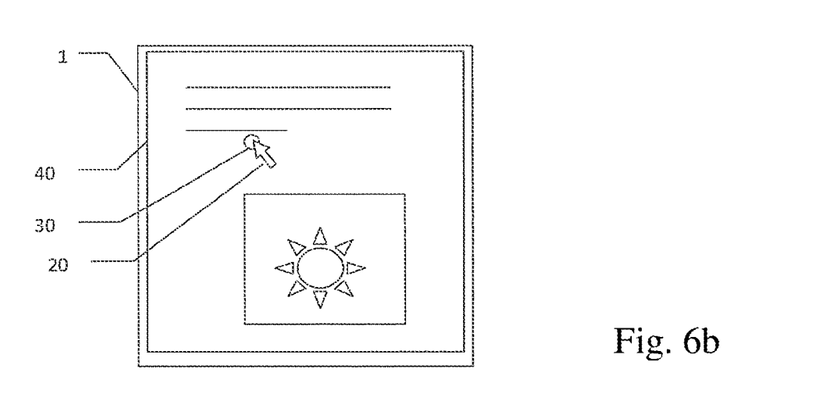

In yet another of its aspects the invention provides a method and system for displaying a web page in 3D space. One advantage of this aspect of the invention is enabling the user to preview a second linked web page over a first source web page in a way which minimizes mouse movements and effort. FIG. 6a shows page 1 with active link 10. When the user clicks with mouse cursor 20 on link 10 graphical object 30 appears over link 10. It is not necessary that graphical object 30 be positioned over link 10 but it is convenient as it minimizes the distances needed to activate the preview of the linked page. FIG. 6b exemplifies the result when the user moves the mouse cursor 20 over graphical object 30, page 40 appears on top of web page 1 and the graphical object 30 appears on top of web page 40. When the mouse cursor 20 is moved off graphical object 30 the situation returns to that of FIG. 6a. This preview action can be reiterated by signaling web page 40 to behave like the web page and not disappear once mouse 20 is moved off graphical object 30. A convenient way to signal page 40 to assume this behavior may be through signaling graphical object 30, as with a click on it or another gesture or key stroke.

Figure 5:
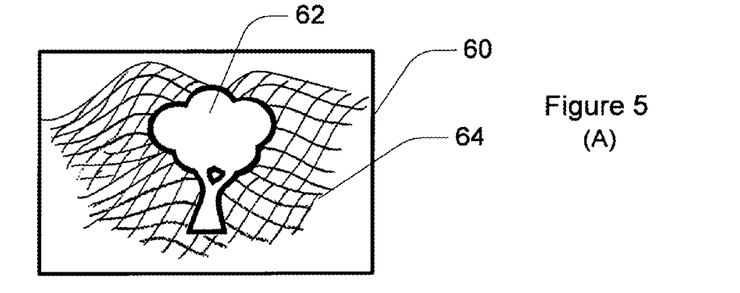
FIG. 5a shows a content element comprising a picture of an object on a background.
FIG. 5b shows a first modified image of the picture of FIG. 5a in which background pixels have become transparent.
FIG. 5c shows a second modified image of the picture of FIG. 5a after application of a bilinear filter to the first modified image.
FIG. 5d shows a third modified image of the picture of FIG. 5a formed by superimposition of the first and second modified images.
FIG. 5e shows a fourth modified image of the picture of FIG. 5a formed by orienting the second modified so as to provide an effect of shading of the object.

In still another of its aspects, the invention provides a method for anti-aliasing of a content element. FIG. 5a shows a content element 60 comprising a picture of an object 62 on a background 64. In accordance with this aspect of the invention, a point is selected in the background 64. The pixels of the content element 60 are scanned and pixels having a color similar to that of the selected background point are made transparent. This generates a first modified image 66 of the content element 60 shown in FIG. 5b. The edges of the object 62 in the first modified image 66 tend to appear to be jagged, as shown in FIG. 5b. A bilinear filter is then applied to the first modified 66 in which the color of a given pixel is replaced with the average of the color of a set of two or more pixels contiguous with the given pixel and including the given pixel. This generates a second modified image 68 of the content element 60 shown in FIG. 5c. In a preferred embodiment, in the second modified image 68, the color of a given pixel is replaced with the average of consecutive pixels in the row of the given pixel, with the given pixel being one of the interior pixels of the four consecutive pixels. The edges of the object 62 tend to appear to be diffuse in the second modified image, as shown in FIG. 5c. The first and second modified images 66 and 68 are then superimposed to generate a third modified image 70 shown in FIG. 5d. In the third modified image 70 the edges of the object 62 tend to appear to be smooth. The second modified image 68, in which the edges of the object 62 appear to be diffuse, is then added to the third modified image 70 in a fourth modified image 72 shown in FIG. 5e, in which the second modified image 68 is oriented so as to provide an effect of shading of the object 62, as shown in FIG. 5e.

Figure 8:
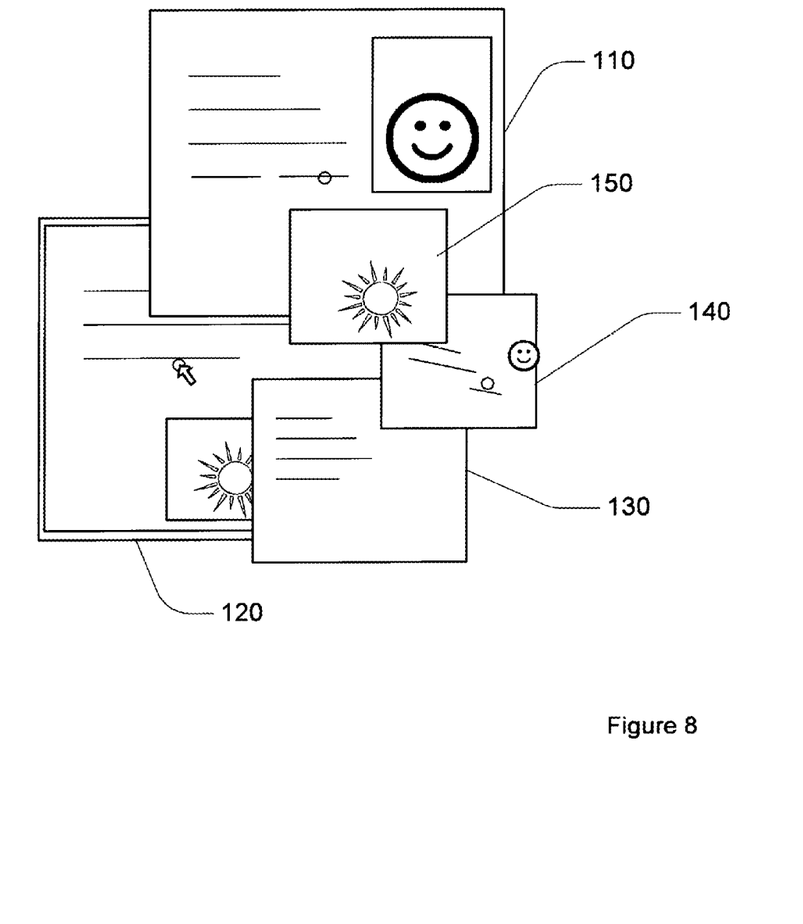
FIG. 8 shows web pages positioned in a 3D space in an inward spiral.

Yet another aspect of the invention provides a method and a system for displaying pages opened in the plane in the 3D space by arranging the pages in a close arrangement formation. Selection of a page, may navigate the user to a direct view of the opened page in the plane. An inward spiral arrangement of pages is a series of rectangles arranged so that the center points of the rectangles delineate an inward spiral. An inward spiral can be used to arrange the pages in the plane according to the ancestry relationship of the pages. FIG. 8 depicts an inward spiral of pages where page 110 represents a first page, page 120 represents a descendant of page 110, page 130 represents a descendant of the page 120, page 140 is a descendent of page 130, and page 150 is a descendent of page 140.

In one embodiment of the invention all of the pages may represent direct descendant relationships between the pages, whether those pages are actually present in the plane or not.

In another embodiment of the invention the pages in the inward spiral represent only pages that actually remained in the plane. This is useful if the user is to quickly navigate only to pages already opened on the plane without opening any additional pages.

The benefit of the inward spiral over other arrangement of page images is that the distances required for mouse moves between the various pages are considerably shorter.

"Determining" something can be performed in a variety of manners and therefore the term "determining" (and like terms) includes calculating, computing, deriving, looking up (e.g., in a table, database or data structure), ascertaining and the like.

It will be readily apparent that the various methods and algorithms described herein may be implemented by, e.g., appropriately programmed general purpose computers and computing devices. Typically a processor (e.g., one or more microprocessors) will receive instructions from a memory or like device, and execute those instructions, thereby performing one or more processes defined by those instructions. Further, programs that implement such methods and algorithms may be stored and transmitted using a variety of media in a number of manners. In some embodiments, hard-wired circuitry or custom hardware may be used in place of, or in combination with, software instructions for implementation of the processes of various embodiments. Thus, embodiments are not limited to any specific combination of hardware and software.

A "processor" means any one or more microprocessors, central processing units (CPUs), computing devices, microcontrollers, digital signal processors, or like devices.

The term "computer-readable medium" refers to any medium that participates in providing data (e.g., instructions) which may be read by a computer, a processorlo or a like device. Such a medium may take many forms, including but not limited to, non-volatile media, volatile media, and transmission media. Non-volatile media include, for example, optical or magnetic disks and other persistent memory. Volatile media include dynamic random access memory (DRAM), which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CDROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read.

Various forms of computer readable media may be involved in carrying sequences of instructions to a processor. For example, sequences of instruction (i) may be delivered from RAM to a processor, (ii) may be carried over a wireless transmission medium, and/or (iii) may be formatted according to numerous formats, standards or protocols, such as Bluetooth, TDMA, CDMA, 3G.

Where databases are described, it will be understood by one of ordinary skill in the art that (i) alternative database structures to those described may be readily employed, and (ii) other memory structures besides databases may be readily employed. Any illustrations or descriptions of any sample databases presented herein are illustrative arrangements for stored representations of information. Any number of other arrangements may be employed besides those suggested by, e.g., tables illustrated in drawings or elsewhere. Similarly, any illustrated entries of the databases represent exemplary information only; one of ordinary skill in the art will understand that the number and content of the entries can be different from those described herein. Further, despite any depiction of the databases as tables, other formats (including relational databases, object-based models and/or distributed databases) could be used to store and manipulate the data types described herein. Likewise, object methods or behaviors of a database can be used to implement various processes, such as the described herein. In addition, the databases may, in a known manner, be stored locally or remotely from a device which accesses data in such a database.

The present invention can be configured to work in a network environment including a computer that is in communication, via a communications network, with one or more devices. The computer may communicate with the devices directly or indirectly, via a wired or wireless medium such as the Internet, LAN, WAN or Ethernet, Token Ring, or via any appropriate communications means or combination of communications means. Each of the devices may comprise computers, such as those based on the Intel® Pentium® or Centrino™ processor, that are adapted to communicate with the computer. Any number and type of machines may be in communication with the computer.

Exemplary Computing Environment

Those skilled in the art will also appreciate that the invention may be practiced in network computing environments with many types of computer system configurations, including personal computers, hand-held devices, multiprocessor systems, microprocessor-based or programmable consumer electronics, network PCs, minicomputers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

Figure 9:
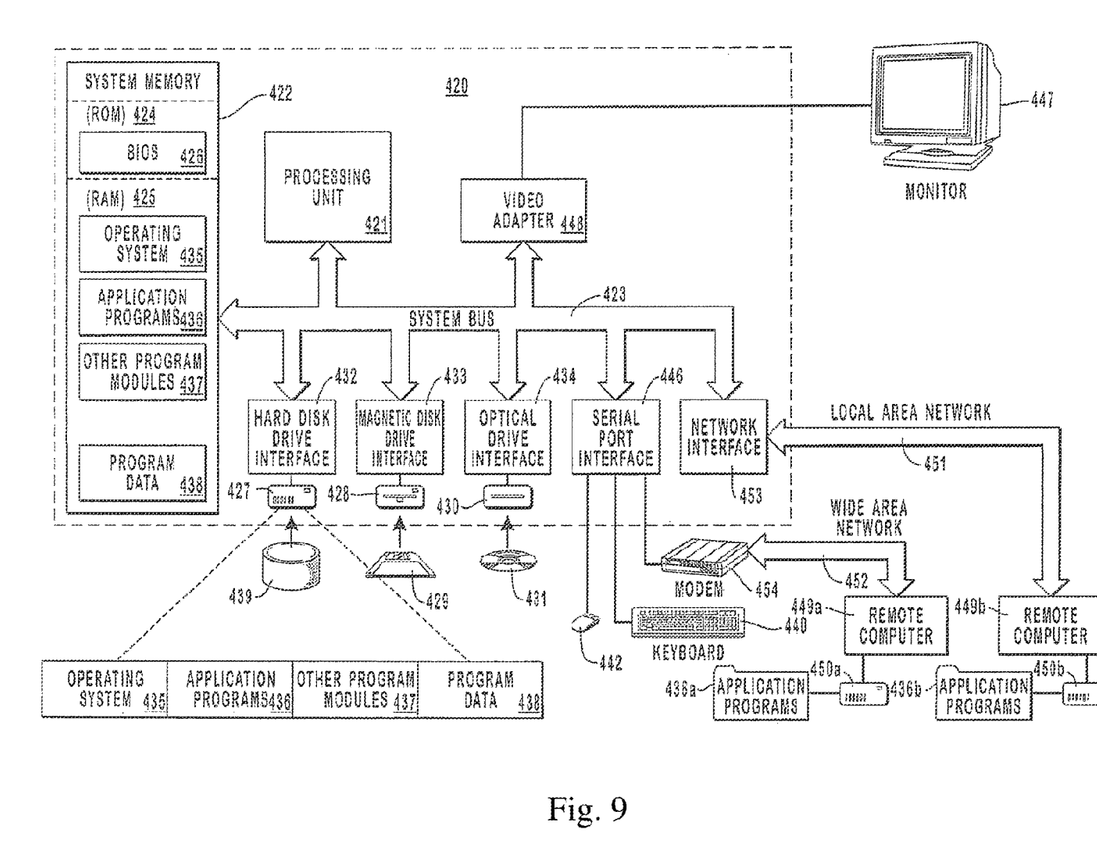
FIG. 9 shows an exemplary system for implementing methods of the invention.

With reference to FIG. 9, an exemplary system for implementing methods of the invention includes a general purpose computing device in the form of a conventional computer 420, including a processing unit 421, a system memory 422, and a system bus 423 that couples various system components including the system memory 422 to the processing unit 421. The system bus 423 may be any of several types of bus structures including a memory bus or memory controller, a peripheral bus, and a local bus using any of a variety of bus architectures. The system memory includes read only memory (ROM) 424 and random access memory (RAM) 425. A basic input/output system (BIOS) 426, containing the basic routines that help transfer information between elements within the computer 420, such as during start-up, may be stored in ROM 424.

The computer 420 may also include a magnetic hard disk drive 427 for reading from and writing to a magnetic hard disk 439, a magnetic disk drive 428 for reading from or writing to a removable magnetic disk 429, and an optical disk drive 430 for reading from or writing to removable optical disk 431 such as a CD-ROM, DVD-ROM or other optical media. The magnetic hard disk drive 427, magnetic disk drive 428, and optical disk drive 430 are connected to the system bus 423 by a hard disk drive interface 432, a magnetic disk drive-interface 433, and an optical drive interface 434, respectively. The drives and their associated computer-readable media provide nonvolatile storage of computer-executable instructions, data structures, program modules and other data for the computer 420. Although the exemplary environment described herein employs a magnetic hard disk 439, a removable magnetic disk 429 and a removable optical disk 431, other types of computer readable media for storing data can be used, including magnetic cassettes, flash memory cards, digital versatile disks, Bernoulli cartridges, RAMs, ROMs, and the like.

Program code means comprising one or more program modules may be stored on the hard disk 439, magnetic disk 429, optical disk 431, ROM 424 or RAM 425, including an operating system 435, one or more application programs 436, other program modules 437, and program data 438. A user may enter commands and information into the computer 420 through keyboard 440, pointing device 442, or other input devices (not shown), such as a microphone, joy stick, game pad, satellite dish, scanner, or the like. These and other input devices are often connected to the processing unit 421 through a serial port interface 446 coupled to system bus 423. Alternatively, the input devices may be connected by other interfaces, such as a parallel port, a game port or a universal serial bus (USB). A monitor 447 or another display device is also connected to system bus 423 via an interface, such as video adapter 448. In addition to the monitor, personal computers typically include other peripheral output devices (not shown), such as speakers and printers.

The computer 420 may operate in a networked environment using logical connections to one or more remote computers, such as remote computers 449 *a* and 449 *b*. Remote computers 449 *a* and 449 *b* may each be another personal computer, a server, a router, a network PC, a peer device or other common network node, and typically include many or all of the elements described above relative to the computer 420, although only memory storage devices 450 *a* and 450 *b* and their associated application programs 436 *a* and 436 *b* have been illustrated in FIG. 9. The logical connections depicted in FIG. 9 include a local area network (LAN) 451 and a wide area network (WAN) 452 that are presented here by way of example and not limitation. Such networking environments are commonplace in office-wide or enterprise-wide computer networks, intranets and the Internet.

When used in a LAN networking environment, the computer 420 is connected to the local network 451 through a network interface or adapter 453. When used in a WAN networking environment, the computer 420 may include a modem 454, a wireless link, or other means for establishing communications over the wide area network 452, such as the Internet. The modem 454, which may be internal or external, is connected to the system bus 423 via the serial port interface 446. In a networked environment, program modules depicted relative to the computer 420, or portions thereof, may be stored in the remote memory storage device. It will be appreciated that the network connections shown are exemplary and other means of establishing communications over wide area network 452 may be used.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method for displaying a set of two or more pages in a 3D virtual space comprising:
    partitioning the set of pages into one or more clusters of pages,
    arranging the pages in a plane in the 3D space so that for each cluster, the pages in the cluster are arranged contiguously in the plane, and
    for each cluster, displaying a boundary in the place around pages of the cluster,
    wherein the step of arranging the pages comprises:
        activating a first link on a first page responsive to a first user input clicking on the first link, thereby opening a second page,
        including the first page and the second page in a first cluster,
        activating a first active link in the second page responsive to a second user input clicking on the first active link, thereby opening a third page,
        including the third page in the first cluster,
        activating a second active link in the second page responsive to a third user input clicking on the second active link, thereby opening a fourth page and
        in response to the opening of the fourth page, removing the third page from the first cluster and including the third page in a second cluster together with the fourth page.

2. The method according to claim 1 wherein a first page from among the set of pages in one of the clusters contains an active link, and a page opened by activating the link is positioned in the plane within the boundary of the cluster in a selectable position relative to the first page.

3. The method according to claim 1 further comprising changing the position of the boundary when a new page is added to the cluster.

4. The method according to claim 1 wherein the boundary has an interior edge and an exterior edge, the interior edge being distinguishable from the exterior edge.

5. The method according to claim 4 wherein the interior edge is sharp and the exterior edge is diffused.

6. The method according to claim 1 wherein the first active links activated in pages already opened in the first cluster open new pages which are included in the first cluster.

7. The method according to claim 1 wherein any number of first child pages opened through activating links in a first page from among the set of pages are included in the same cluster as the first page.

8. A system comprising a processor configured to execute a method according to claim 1.

9. A computer program product for use in a computer system, the computer program product comprising one or more non-transitory computer-readable media having stored thereon computer executable instructions that, when executed by a processor, cause the computer system to perform the method recited in claim 1.

* * * * *